Dec. 3, 1929.                C. J. ROOD                 1,737,946
                SHUTTER MECHANISM FOR AUTOMOBILE RADIATORS
                    Filed April 26, 1928        3 Sheets-Sheet 1
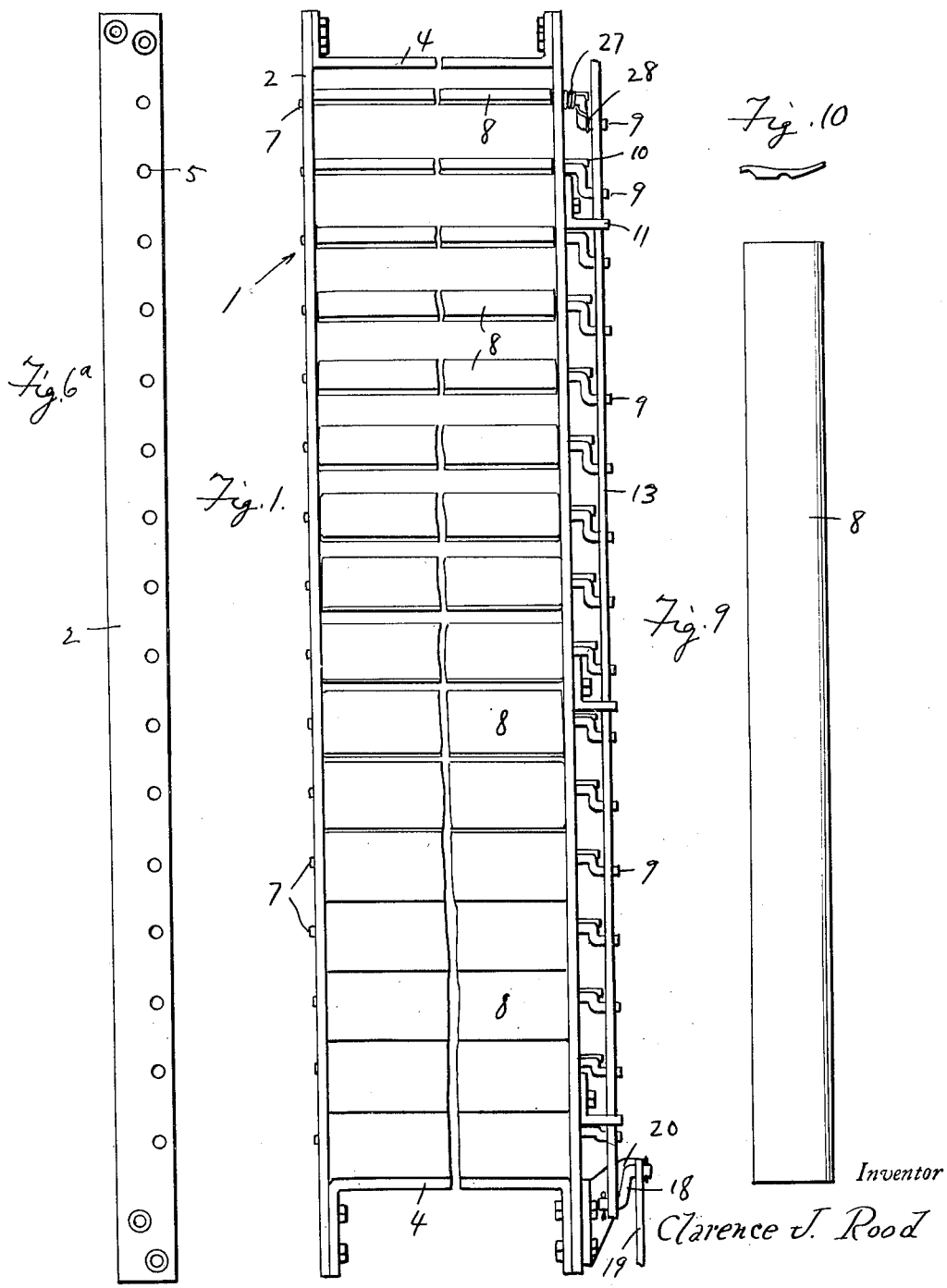
Inventor
Clarence J. Rood
By Clarence A. O'Brien
Attorney Dec. 3, 1929. C. J. ROOD 1,737,946
SHUTTER MECHANISM FOR AUTOMOBILE RADIATORS
Filed April 26, 1928 3 Sheets-Sheet 2
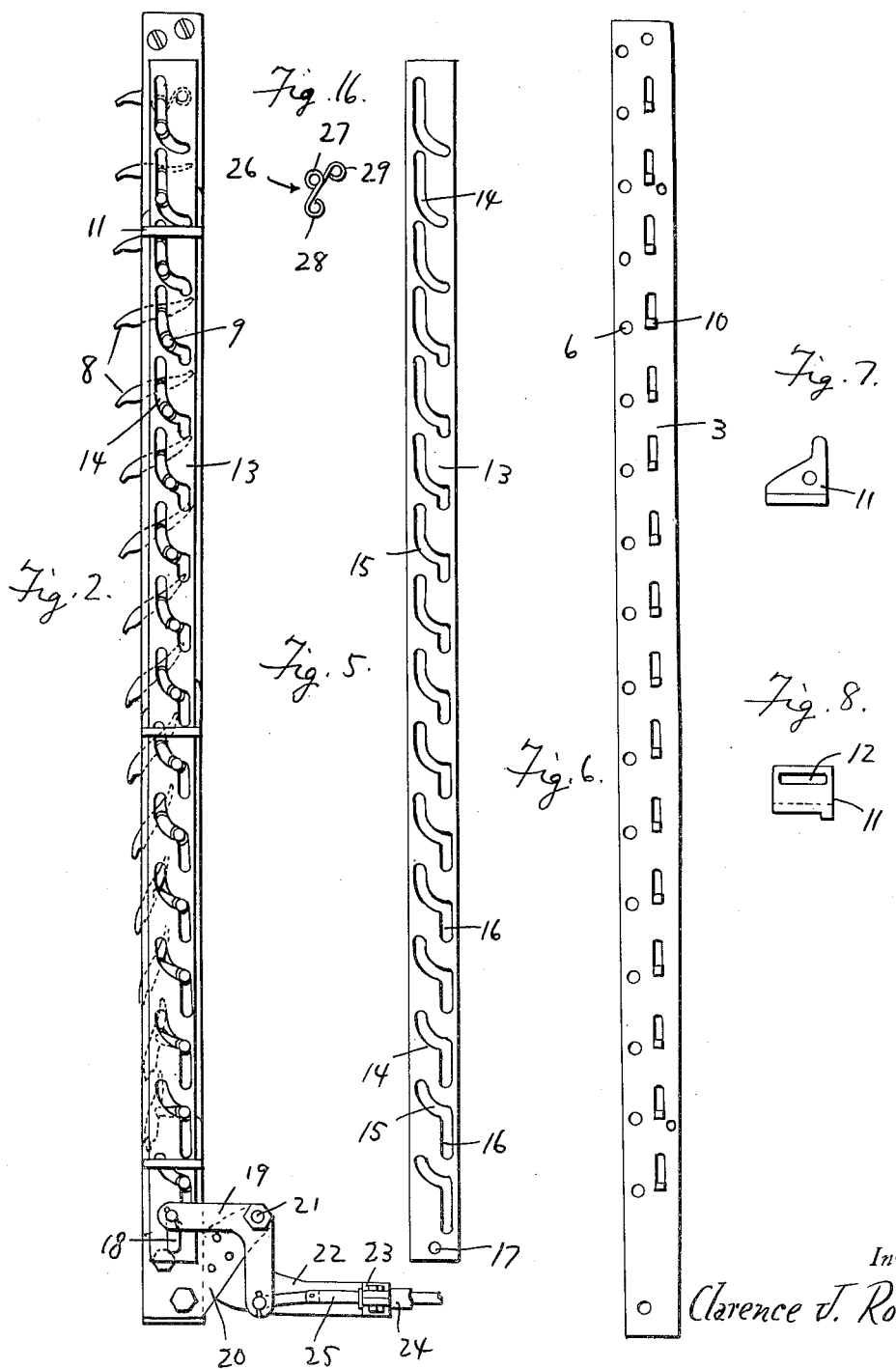

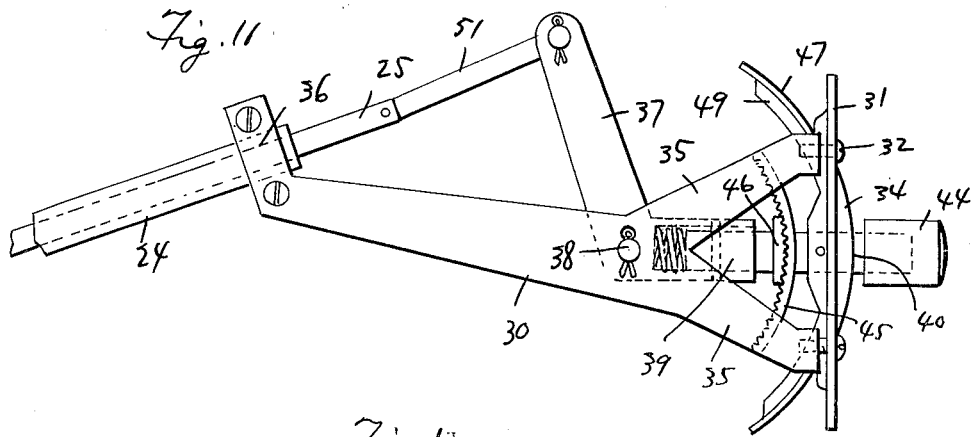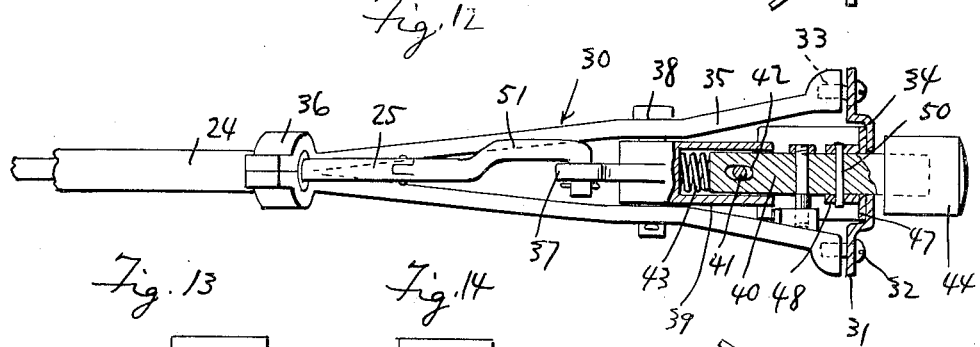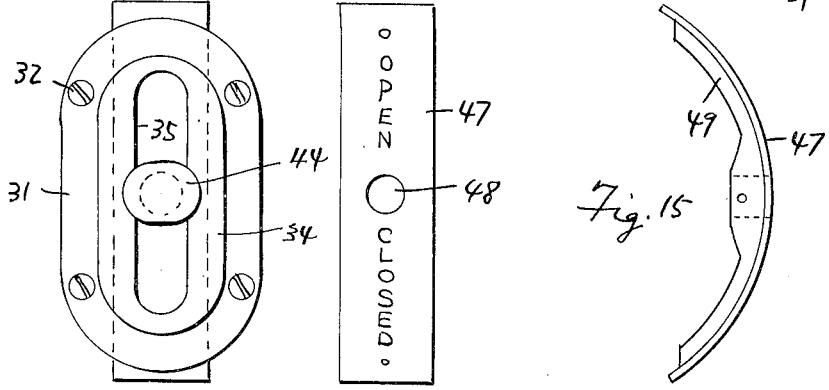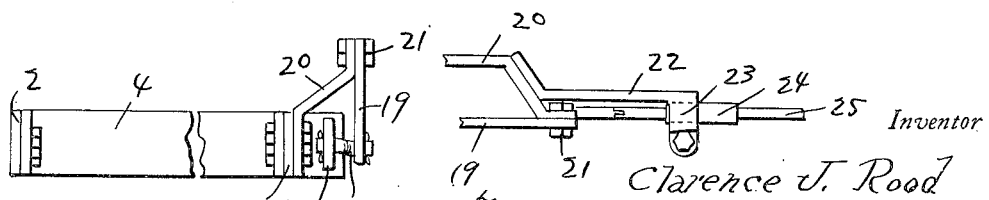

Patented Dec. 3, 1929

1,737,946

UNITED STATES PATENT OFFICE

CLARENCE J. ROOD, OF FERGUS FALLS, MINNESOTA

SHUTTER MECHANISM FOR AUTOMOBILE RADIATORS

Application filed April 26, 1928. Serial No. 272,957.

The present invention relates to improvements in shutter mechanisms for automobile radiators and has for its principal object to provide a structure that includes a series of pivoted shutters that are uniformally and successively opened and closed.

One of the important objects of the present invention is to provide a shutter mechanism that is operable from the dash board of an automobile, at the will of the operator, means being provided for holding the shutters in any adjusted position.

A further object is to provide a shutter mechanism of the above mentioned character which will, at all times be positive and efficient in its operation, the same being further simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and in which like numerals designate like parts throughout the several views:

Figure 1 is a front fragmentary elevation of the shutter mechanism embodying my invention, showing the lowermost shutters in a closed position, the intermediate shutters in a partially closed position, and the uppermost shutters in a fully opened position.

Figure 2 is a side elevation thereof.

Figure 3 is a fragmentary bottom plan view of the unit that is adapted for disposition in front of the automobile radiator.

Figure 4 is a bottom plan view of the bracket secured on the lower end of one of the side bars of the frame and on which is supported the bell crank lever, the actuating means for the bell crank lever being fragmentarily illustrated in this figure.

Figure 5 is a side elevation of the sliding bar that forms a salient part of the present invention.

Figure 6 is a side elevation of one of the side bars of the unit that is mounted on the front of the radiator.

Figure 6ª is a similar view of the complementary bar of said unit.

Figure 7 is a side elevation of one of the guides for the slidable bar.

Figure 8 is a top plan view thereof.

Figure 9 is a top plan view of one of the shutters.

Figure 10 is an end elevation thereof.

Figure 11 is a side elevation of the actuating means that is adapted to be mounted on the dash board of an automobile.

Figure 12 is a top plan view thereof, parts being shown in section.

Figure 13 is a front elevation showing the cover plate.

Figure 14 is a front elevation of the curbed indicator unit.

Figure 15 is a side elevation thereof, and

Figure 16 is a detail perspective view of one of the spring units for association with the crank formed on the outer end of each shutter supporting rod.

In the drawings, wherein for the purpose of illustration is shown the preferred embodiment of my invention, the numeral 1 designates generally the unit that is adapted to be mounted on the front of the automobile radiator in any appropriate manner, the same comprising a pair of spaced side bars 2 and 3 respectively that are connected together at their upper and lower ends by the cross pieces shown at 4.

These side bars are formed with a series of spaced openings designated by the numerals 5 and 6 respectively and the same are arranged in pairs for receiving the end portions of the transversely extending rods 7. A shutter forming vane 8 is secured on each rod for disposition between the side bars 2 and 3 and in such a manner as to move simultaneously with the actuation of the rod. The vanes or shutters are of such construction as to cause the same to be disposed in overlapping relation when all of the shutters are closed, and the cross sectional shape of each shutter is clearly shown in Figure 10 of the drawings.

The ends of the rods that extend through the openings 6 formed in the side bar 3 are formed with the cranks 9 and the purpose thereof will be presently described.

A series of spaced tongues 10 are struck out from the side bar 3, for disposition adjacent the respective openings 6, and this arrangement is clearly illustrated in Figure 6 of the drawings.

A pair of angular brackets, shown at 11, are secured on the outer face of the side bar 3, the horizontal portion of each bracket being formed with a slot 12, and slidable through the aligned slots of these brackets is the actuating bar 13, shown in Figure 5, in detail. This bar is formed with a series of spaced slots 14 for the entire length of the bar, and as is more clearly shown in Figure 5, each slot is different. To better explain the shape of the slots 14, it may be well to state at this point that the curvature of the slots gradually increases from the lowermost one to the uppermost slot and in a similar manner, the lower ends of the slots are formed with vertical portions that increase in length toward the lowermost slot. The vertical portion of the slot that extends downwardly from the lower ends of the curved portions is designated by the numeral 16.

The lower end of the slidable slotted plate or bar 13 is formed with an opening 17, through which extends one end of a crank 18, the other end of this crank being operatively connected to the outer end of the horizontally disposed arm of a bell crank lever 19. This bell crank lever is pivotally supported on an offset bracket 20 that is secured on the lower end of the side bar 3 of the unit or frame 1, the pivotal support for the bell crank lever being designated by the numeral 21. This offset bracket 20 is provided with a lateral extension 22, the outer end of which is formed with a laterally disposed clamp 23, in which is secured the forward end of the flexible tubing 24 and slidable through the tubing is the actuating rod 25, the forward end of this rod being connected to the lower end of the vertical arm of the bell crank lever as shown very clearly in Figure 2.

A spring unit, such as is shown generally at 26, in Figure 16 of the drawings, is associated with each of the crank ends 9 of the shutter supporting rods 7. This spring unit includes an axial coil spring 27 that encircles the outer end portion of each rod 7, one end of the axial coil spring being disposed in one direction and terminating in an eye 28 for disposition over the outer end of the crank 9 while the other end of the axial coil spring is disposed in the opposite direction and terminates in an eye 29 for disposition over the adjacent laterally projecting tongue 10 that is struck out from the side bar 3.

The springs normally hold the shutters in a closed position.

The actuating means for the shutter mechanism will now be described in detail. A substantially V-shaped bracket 30 is disposed forwardly of the instrument board (not shown) and is secured thereto by means of a cover plate 31 that is adapted for disposition on the outer face of the instrument board over an opening or slot formed in the instrument board and suitable screws 32 are formed in this cover plate and are threaded into threaded sockets provided therefor at the ends of the arms of the V-shaped bracket 30, as shown at 33. This cover plate 31 is formed with a central raised portion 34, and an elongated slot 35 is formed in this raised portion for registration with the slot formed in the instrument board.

As more clearly illustrated in Figure 11, the outer ends of the arms of this substantially V-shaped bracket 30 are formed with diverging flanges denoted by the numeral 35', and the threaded sockets 33 are formed in the ends of the branches to receive the screws 32.

The apex portion of the V-shaped bracket 30 is formed with an upwardly disposed inclined split collar 36, through which extends the rear end of the flexible tubing 24 and the operating rod 25 for the bell crank lever 19 projects beyond the rear end of the flexible tubing and is operatively connected to the upper end of the vertically disposed lever 37. This lever is pivotally secured at its lower end on the transverse pin 38 that extends through the intermediate portions of the arms of the V-shaped bracket 30 forwardly of the diverging branches 35'. The pivoted end of this lever is formed with a laterally extending socket 39 for receiving the slotted inner end of the arm 40. A pin 41 extends transversely through the socket 39 for disposition through the slot 42 formed in the inner end portion of this arm 40 and in this manner, said arm is capable of longitudinal sliding movement with respect to the socket. An expansible coil spring 43 is arranged within the socket for disposition between the inner end of said socket and the adjacent end of the arm for normally urging said arm outwardly of the socket. The outer end of the arm extends through the slot 35 formed in the raised portion of the cover plate 31 and a finger engaging head 44 is secured on the outer end of this arm for actuating the same.

A segmental rack bar 45 is carried by the inner faces of one pair of diverging branches 35', and adapted for cooperation with the teeth of this rack bar is the pawl 46 that is carried by the intermediate portion of the arm 40.

This pawl and segmental rack bar provide a means for holding the pivoted lever in any adjusted position, whereby to maintain the shutters in any predetermined position.

The spring 43 will normally hold the pawl 46 in locking engagement with the ratchet teeth of the rack bar 45, and manifestly by pushing inwardly on the head 44, the pawl may be moved out of engagement with the rack bar to facilitate the swinging movement of the lever in any vertically adjusted position.

Also carried by the arm 40 is the arcuate indicator plate 47, that is formed with a central opening to accommodate the arm and furthermore, this plate 47 is formed on its inner face with the spaced flanges 49, the intermediate portions of the flanges being enlarged to accommodate a transverse locking pin 50 that extends through openings formed in the enlarged portions of the flanges and through the arm 40. The opening formed in the central portion of this plate to accommodate the arm is shown at 48.

The front face of this curved plate 47 has arranged thereon suitable indicating indicia indicative of the position of the shutters, and this indicia is visible through the slot 35, the plate 47 being disposed within the portion 34 and being adapted for movement simultaneous with that of the arm 40.

The connecting means between the upper end of the rod 25 and the upper end of the lever 37 is shown at 51.

As heretofore explained, the springs 26 normally maintain the shutters 8 in a closed position and the slidable bar 13 in a lowered position. In opening the shutters, the head 44 is pushed inwardly toward the cover plate 41, causing the pawl 46 to be disengaged from the rack bar 45, whereupon the arm 40 can be swung vertically in the slot 35, and this sliding movement of the arm in a vertical position will actuate the lever 37, to exert a rearward pull on the rod 25, which will, in turn effect an actuation of the bell crank lever 19. The bell crank lever when operated will actuate the crank 18 to raise the bar 13 in its guide 11, and this upward sliding movement of the bar 13 will result in the movement of the shutters to an open position, said shutters being successively opened from the top to the bottom of the unit, by reason of the arrangement of the slots 14. The shutters will be closed, in the reverse order, that is to say, the lowermost shutters will close first and the closing of the shutters is also successive from the lowermost one to the top shutter.

When the parts are arranged as shown in Figures 1 and 2 of the drawings, it will be observed that the uppermost shutters are in the fully opened position, the intermediate shuttters are in a partially open position, while the lower shutters are in a closed position, and these shutters are held in this position by the pawl and rack bar arrangement shown in Figure 11 and described in detail above.

When the arm is moved to the lowermost end of the slot 35, the shutters will be in a fully open position, while when the arm is disposed in the uppermost end of the slot, the shutters will be in a fully closed position, and will be so held during the action of the spring units 26. The plate 47 bearing the indicating indicia will be visible through the slot 35, so as to readily indicate to the operator the position of the shutters, at all times.

While I have shown the shutter units as being adapted for disposition in a vertical manner on the front of an automobile radiator, it is to be understood that said unit may also be arranged horizontally so that instead of the shutters swinging upwardly and downwardly the same will be caused to swing inwardly and outwardly on vertical pivots, instead of horizontal pivots.

A shutter mechanism of the above mentioned character can be readily and easily attached on an automobile radiator without necessitating any material alterations and the actuating mechanism for the shutters may be mounted in any convenient location on the instrument board where the operator may have ready access thereto.

By arranging the shutters in the manner as shown so that the lowermost shutter will open last, and close first, the radiator can be maintained at the proper temperature during cold weather.

While I have shown the preferred embodiment of my invention, it is to be understood that various changes in the size, shape and arrangement of parts may be resorted to, without departing from the spirit of the invention and the scope of the appended claims.

Having thus described my invention, what I claim as new is:

1. In a shutter mechanism for automobile radiators, a frame provided with a plurality of shutters pivotally mounted thereon, a slidable bar mounted on the frame including the shutters, operating means for the bar comprising a bell crank lever supported on the frame adjacent one end of the bar, a crank cooperatively connecting the bell crank lever with the adjacent end of the bar, an operating rod connected to the bell crank lever, a manually operable lever supported at a distant point for vertical swinging movement and connected to said rod, an arm operatively connected with the lever for operating the same and a pawl and ratchet mechanism associated with the arm for holding said lever in any adjacent position to maintain the shutters in a predetermined relation with respect to each other.

2. In a shutter operating mechanism, a bell crank lever mounted on the frame of the shutter mechanism and connected at one end to said mechanism, a bracket for attachment to the instrument board of an automobile, a vertically swinging lever mounted on the bracket, operative connection between the bell crank lever and said vertically swinging lever, an arm operatively connected with the vertically swinging lever for actuating the same, and a pawl and ratchet mechanism associated with the arm and the bracket for holding said lever in any adjusted position.

3. In a shutter operating mechanism, a bell crank lever mounted on the frame of the shutter mechanism and connected at one end to said mechanism, a bracket for attachment on the instrument board of an automobile, a vertically swinging lever mounted on the bracket, operative connection between the bell crank lever and said vertically swinging lever, a laterally extending socket member carried by the pivoted end of the vertically swinging lever, an actuating arm having its inner end slidably secured in the socket member, a segmental rack bar arranged on the bracket, a pawl carried by the arm for cooperation with the rack bar to secure the lever in any adjusted position, said lever being operable when the arm is pushed inwardly to disengage the pawl from the rack bar, and resilient means arranged within the socket member for cooperation with the inner end of the slidable arm to normally maintain the pawl in engagement with the rack bar.

In testimony whereof I affix my signature.

CLARENCE J. ROOD.